(12) United States Patent
Song

(10) Patent No.: US 8,210,500 B2
(45) Date of Patent: Jul. 3, 2012

(54) SEAT RING

(76) Inventor: Yongsheng Song, Shanghai (CN)

( * ) Notice: Subject to any disclaimer, the term of this patent is extended or adjusted under 35 U.S.C. 154(b) by 823 days.

(21) Appl. No.: 12/278,264

(22) PCT Filed: Feb. 5, 2006

(86) PCT No.: PCT/CN2006/000193
§ 371 (c)(1),
(2), (4) Date: Aug. 4, 2008

(87) PCT Pub. No.: WO2007/087739
PCT Pub. Date: Aug. 9, 2007

(65) Prior Publication Data
US 2009/0008593 A1      Jan. 8, 2009

(51) Int. Cl.
*F16K 5/00* (2006.01)
(52) U.S. Cl. .................... 251/315.01; 251/314; 251/316
(58) Field of Classification Search .................. 251/328, 251/314, 315.01, 316
See application file for complete search history.

(56) References Cited

U.S. PATENT DOCUMENTS

| | | | | |
|---|---|---|---|---|
| 3,542,337 A | * | 11/1970 | Scaramucci | 251/209 |
| 3,596,876 A | * | 8/1971 | Scaramucci | 251/306 |
| 5,322,261 A | * | 6/1994 | Aarnes | 251/159 |
| 6,666,433 B1 | * | 12/2003 | Pierce | 251/359 |

* cited by examiner

*Primary Examiner* — John Fristoe, Jr.
*Assistant Examiner* — Marina Tietjen
(74) *Attorney, Agent, or Firm* — Global IP Services; Tianhua Gu

(57) ABSTRACT

An upstream seat ring and an auxiliary seat ring, which improve valve's capability resistant to erosion by the fluid carrying solid particles or containing liquid drops. One end of the auxiliary seat ring passes through bore of the upstream seat ring and the other end is fixed in the pocket of the valve upstream passageway. There are many bar barriers or analogous mechanism with rectangular, tooth-like or any other geometrical shapes cross-section around the circumferential surface of their bores, which are radially concaved inward or projected outward from the circumferential surface, are longitudinally extended an overall distance from one radial end face of the seats to opposite radial end face or a distance from the radial end face next to the upstream surface of the valve closure member towards the opposite radial end face, and spaced each other radially.

4 Claims, 3 Drawing Sheets

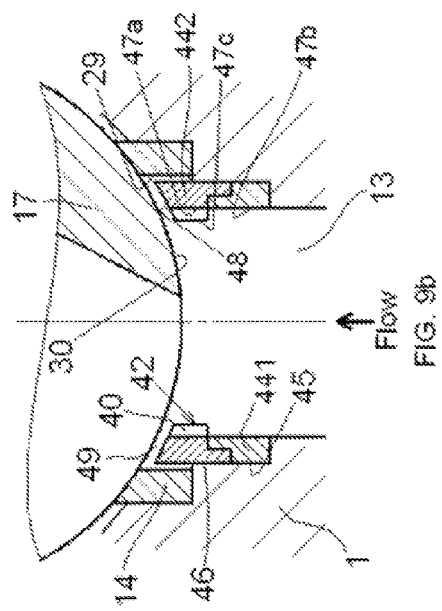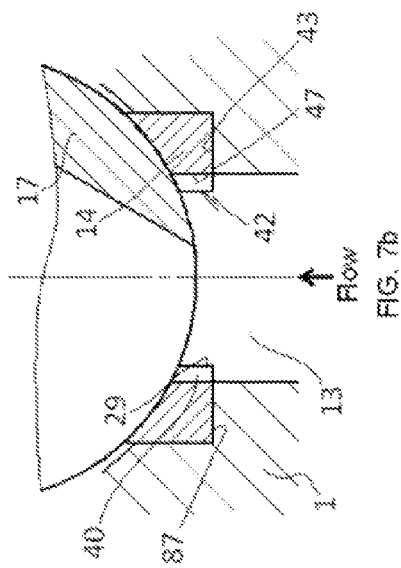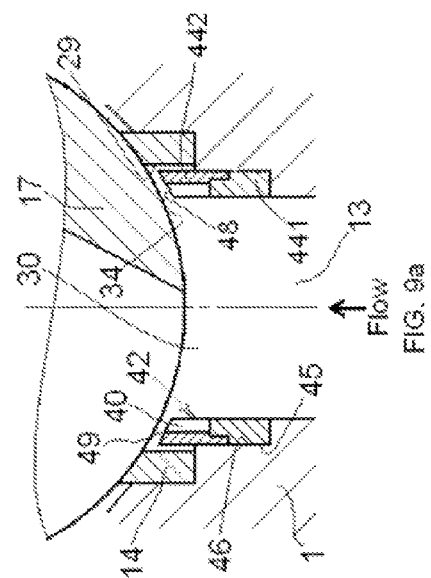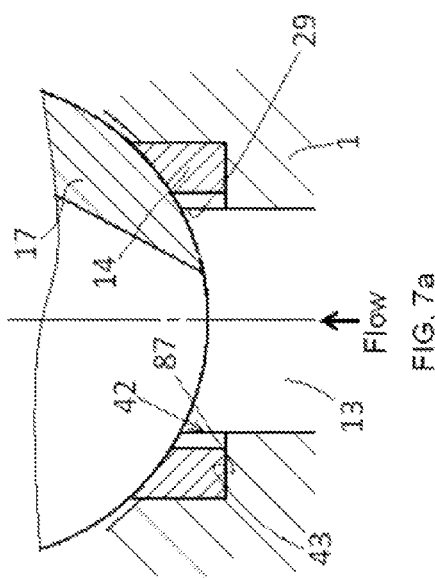

SEAT RING

FIELD OF THE INVENTION

This invention relates to valves, and more particularly to a seat ring or an auxiliary seat ring both being installed in upstream passageway of the valves to improve the capability of the valves resistant to erosion by solid particles (such as grains, powders, crystals and polymers) or liquid drops carried in fluid. There are many bar barriers or analogous mechanism with rectangular, tooth-like or any other geometrical shapes cross-section around the circumferential surface of bore of the seat rings, which are radially concaved inward or projected outward from the circumferential surface, longitudinally extended an overall distance from the radial end face of one end to the opposite radial end face of the other end along axis of the seat rings, or a distance from the radial end face close to the upstream surface of a valve closure member towards the opposite radial end face, and spaced each other radially.

BACKGROUND OF THE INVENTION

For ball valve (including hemispherical valve, segment ball valve), plug valve and gate valve, etc., the fluid flowing to the upstream surface of closure member of the valves will be split into two branches after flowing into the valves during on-off or regulating movement of the valves. One branch of the fluid flows directly through the upstream opening formed by a closure member and an upstream seat ring and to downstream side of the valves in unobstructed. Having touched the upstream surface of the closure member exposed in the upstream passageway of the valves, the other branch disperses radially, some of it flows to the circumferential surface of bore of the upstream seat ring, and impinges it radially, and then the dispersed fluid converges into two streams flowing in the opposite directions around it, and presses against the circumferential surface of bore of the seat ring and the upstream surface of the closure member adjacent to it while is flowing around them tangentially, at last two streams flow through the upstream opening respectively to downstream side of the valves; and the rest flows directly into the upstream opening pressing against the upstream surface radially. Therefore the circumferential surface of bore of the upstream seat ring exposed in the upstream passageway of the valves will ceaselessly suffer impingement by the fluid flowing radially and tangentially.

The circumferential surface of bore of an upstream seat ring in the prior art valves will be worn out quickly, if the fluid carries the solid particles or contains the liquid drops, and it results in the seat ring not effectively keeping sealing with the upstream surface of the closure member any more when the valves are in fully closed position, there is a leakage in the valves, and then the leaking opening will be fast expanded, so the valves have to be repaired. Especially for soft seated valve, the upstream soft seat ring made of polymers will be cut into two pieces by the abrasive fluids rapidly. The piece not supported by the upstream surface of the closure member will be incorporated in the fluid and flows to downstream along with it during opening and closing movement of the valves, so the valve is damaged severely and cannot be used any more.

THE SUMMARY OF THE PRESENT INVENTION

The present invention is to provide a novel seat ring configuration in order to greatly enhance its capability resistant to erosion.

There are many bar barriers or analogous mechanisms on the inner circumferential surface of the bore of both seat ring according to the present invention, for example the ones with rectangular, tooth-like transverse cross-section or any other geometric shapes, which are radially concaved inward or projected outward the circumferential surface of the upstream seat ring, parallel to its axis, longitudinally extended an overall distance from its one radial end face to the other radial end face and radially spaced each other around the circumferential surface.

According to my invention, there is another auxiliary seat ring in the upstream passageway in addition to the upstream seat ring, one end of which is fixed in the pocket of the valve upstream passageway and the other end passes through the bore of the upstream seat ring. The radial end face of the other end has a clearance with the upstream surface of the closure member for a free movement of ball closure member relative to body housing. And the width of clearance should be as narrow as possible so that the flow passing through the clearance radially will meet with much resistance, its velocity flowing to the circumferential surface of bore of upstream seat ring becomes very slow and erosion of it gets alleviated during opening and closing movement of the valve. Thus the auxiliary seat ring separates the upstream seat ring from the fluid flowing in the upstream passageway of the valves, and the circumferential surface of its bore contacts directly the flow and suffers the erosion as described above in lieu of the upstream seat ring, so the upstream seat ring is protected by the auxiliary seat ring.

The radial end face of the other end of the auxiliary seat ring can be engaged with the upstream surface of the closure member the same as the upstream seat ring, as a result, it is endowed a function scraping off the substances adhered to the upstream surface of a closure member. Especially for the soft seat valves, it will have better function scraping off the substance adhered to the upstream surface of ball closure member than metal seat valves if it is provided with the grooves with tooth-like transverse cross-section around the circumferential surface of its inner bore as described below.

Or there are many bar barriers or analogous mechanisms distributed around the circumferential surface of bore of an auxiliary seat ring for example the ones with rectangular, tooth-like or any other geometrical shapes cross-section, which are concaved inward or projected outward from the circumferential surface of the auxiliary seat ring radially, and longitudinally extended an overall distance from its one radial end face to opposite radial end face or a distance from the radial end face close to the upstream surface of the valve closure member towards the opposite radial end face, and radially spaced each other around the circumferential surface.

Based on this invention, these bar barriers or analogous mechanisms of either upstream or auxiliary seat ring can make some of the fluid with the solid particles or liquid drops, which disperses radially pressing against the upstream surface of the closure member having touched on it and flows to the circumferential surface of bore of the seat rings, stagnated in the grooves formed by every two adjacent bar barriers or bodies of analogous mechanisms. The fluid with the solid particles or liquid drops stagnated in the grooves previously will cushion the velocity of the subsequent fluid and particles or liquid drops for impacting on the inner walls of the grooves. The decelerated fluid will spill out the grooves, and converge respectively into two streams flowing in the opposite directions around the circumferential surface. The velocity of two streams is further decreased owing to being one after another impeded by the bar barriers or analogous mechanisms while they are flowing over them. The multistage deceleration of the fluid and the solid particles or liquid drops can reduce their kinetic energy for eroding the inner walls of the grooves and the circumferential surface of bore of the seat rings, including the adjacent upstream surface of the valve closure member, the loss of their material becomes minimized. Moreover, two decelerated streams form a thick flow layer flowing slowly towards the upstream opening around the circumferential surface. This flow layer is propitious to decreasing further the velocity of subsequent fluid with the particles or liquid drops entering the grooves and the kinetic energy impinging on the inner walls of the grooves and the circumferential surface of bore of the seat rings radially, including adjacent upstream surface of the valve closure member.

These bar barriers or analogous mechanisms distributed around the circumferential surface of an upstream seat ring and an auxiliary seat ring can also change the flow field of the fluid passing through the upstream opening of valves. The modified flow field can alleviate erosive failure of upstream seat ring and body housing of the valves.

BRIEF DESCRIPTION OF THE DRAWINGS

The above description, as well as further objects, features and advantages of the present invention will be more fully understood with reference to the following detailed description of a valve, when taken in conjunction with the accompanying drawings, wherein

FIG. 7a and FIG. 7b are the fragmentary sectional views of the ball valve provided with the seat ring as showing in FIG. 3 and FIG. 5 in its upstream passageway.

FIG. 9a and FIG. 9b are the fragmentary sectional views of the ball valve provided with the auxiliary seat rings improved on the ones illustrated in FIG. 8 according to the embodiments of the present invention respectively.

DETAILED DESCRIPTION OF PREFERRED EMBODIMENTS

All seat rings are an annulus although the sealing surface of ball closure member of a ball valve is spherical, the sealing surface of plug closure member of a plug valve is conical or cylindrical and the sealing surface of gate closure member of a gate valve is planar. The present invention is concerned with the seat rings, particularly with the circumferential surface of their bores which are cylindrical. In order to be simplified, the seat ring of a ball valve will be taken as an example of the seat rings of a hemispherical ball valve, V-port ball valve, plug valve and parallel-slide gate valve when the embodiments of the present invention are disclosed underneath in illustration. An auxiliary seat ring and the circumferential surface of its bore are also involved in the present invention.

Figure 1:
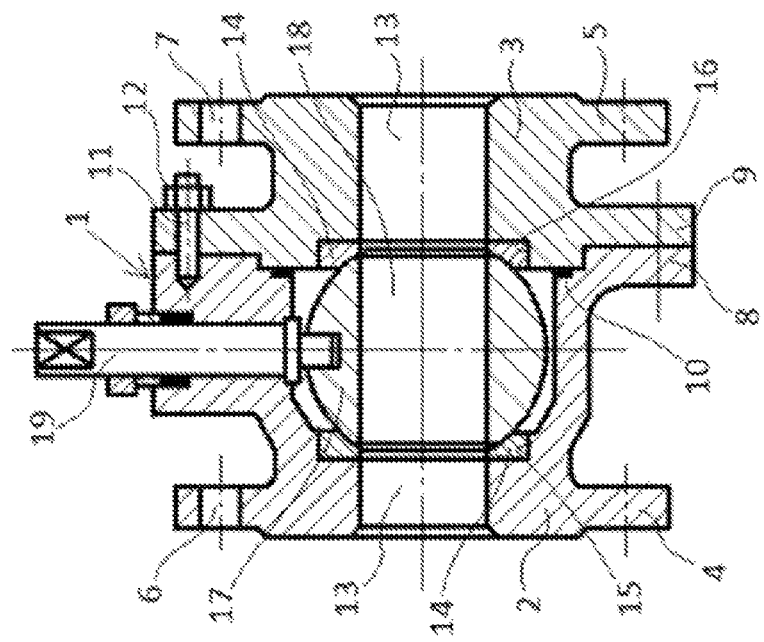
FIG. 1 is a longitudinal elevation sectional view of a prior art ball valve in fully open position.
Figure 2A:
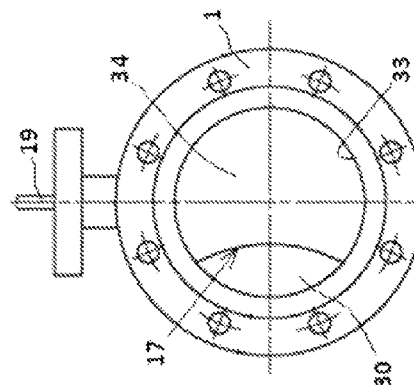
FIG. 2a is a side view of a prior art ball valve.
Figure 2B:
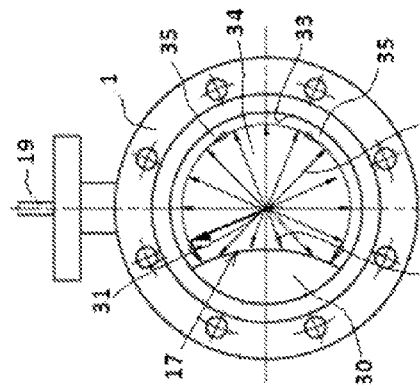
FIG. 2b is the same side view of a prior art ball valve as FIG. 2a, showing streamlines of the fluid before it flows into the upstream opening formed by an upstream seat ring and a ball closure member.
Figure 3:
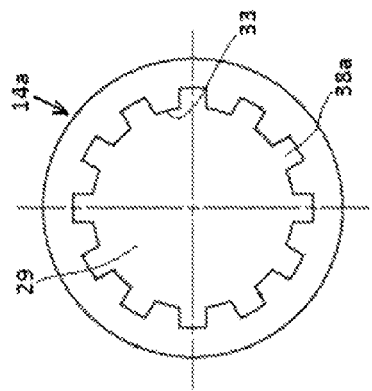
FIG. 3 is an lavational view of the seat ring in accordance with one embodiment of the present invention, showing many bar barriers with rectangular transverse cross-section around the circumferential surface of bore of the seat ring which are concaved inward or projected outward from the circumferential surface radially, extended an overall distance from one radial end face of the seat ring to the opposite radial end face longitudinally, and spaced each other radially.

Reference is now made to the accompanying drawings for a detailed description of the specific embodiments of the present invention, including the prior art valves in FIG. 1, FIG. 2 and FIG. 3 for becoming better understood.

FIG. 1 is a cross-section in elevation view of a ball valve constructed in accordance with the prior art, which includes a valve housing 1, a ball closure member 17 having a regular curvature surface, a stem 19 and two seat rings 14, etc. Valve housing 1 consists of a left-hand housing section 2 and a right-hand housing section 3 with flanges 4 and 5 on their external ends respectively used to be connected with pipelines by threading nuts onto bolts (not shown) through holes 6 and 7 on them, and with the other flanges 8 and 9 on its internal ends respectively, between which is disposed a gasket 10 used to effect a seal. One end of stud bolts 11 is screwed into tapped holes in flange 8 on section 2, the other end of them passed through registering holes in flange 9 on section 3, and then nuts 12 are screwed onto free ends of stud bolts 11. Gasket 10 is compressed when flanges 8 and 9 are joined together, thereby two sections 2 and 3 form the unitary valve housing 1.

A pair of seat rings 14 are received within appropriate seat recesses 15 and 16 of left-hand housing section 2 and right-hand housing section 3 surrounding passageway 13 respectively, and defined between valve housing 1 and ball closure member 17. The seat rings have the same inner diameter as passageways 13 of housing sections 2 and 3.

Ball closure member 17 mounted between two seat rings 14 has a cylindrical flowway 18 extending therethrough. When its axis is registered with axis of passageway 13, the valve is stayed in fully open position permitting the fluid to flow through expeditely. The solid surface of the ball closure member completely blocks passageway 13 after stem 19 turns ball closure member 17 through 90° about its own axis, and the ball valve is in fully closed position (not shown).

FIGS. 2a and 2b are side views of the prior art ball valve respectively, in which ball closure member 17 is mounted between upstream and downstream cylindrical passageways 13 (refer to FIG. 1), and is a moving element defined between passageways 13. The diameter of bore 29 of seat rings 14 (refer to FIG. 3 and FIG. 5) is in general equal to end of the passageways adjacent to them.

In FIG. 2, the circumferential surface of bore of seat ring 14 is designated as the number 33, the opening formed by flowway 18 of ball closure member 17 and upstream seat ring 14 (not shown) as 30, and the upstream surface of ball closure member 17 exposed in upstream passageway 13 during on-off or regulating movement of the valve as 34. The size of opening 30 is being increased from zero to the maximum or decreased from the maximum to zero gradually with the ball closure member moving, and the fluid in upstream passageway 13 of the valve flows through opening 30 to downstream at the same time.

As shown in FIG. 2b, one branch of the fluid (not shown in streamlines) facing over against opening 30 flows through it in unobstructed. The other branch facing over against upstream surface 34 of ball closure member 17 disperses radially according to the direction shown by flow arrows 31 and flows towards circumferential surface 33 having touched on surface 34, in which some fluid 37 converges into two streams flowing in the opposite directions and to opening 30 around circumferential surface 33 respectively after impacting on it, and changes flow directions uninterruptedly as shown by arrows 35; the rest flows directly into opening 30 pressing against upstream surface 34 of ball closure member 17 according to the direction shown by flow arrows 36.

FIG. 3 is an embodiment of the present invention, showing an improved seat ring 14a mounted in recess of upstream passageway 13 of the ball valve (refer to FIG. 1). Seat ring 14a has many bar barriers 40 with rectangular transverse cross-section around circumferential surface 33 of its bore 29, which are radially concaved inward or projected outward from circumferential surface 33, parallel to axis of seat ring 14a, extended an overall distance from the radial end face of one end to the opposite radial end face of the other end of seat ring 14a along its axis, spaced each other radially. Grooves 38a formed between two adjacent bar barriers 40 also take the shape of a rectangular transverse cross-section.

Figure 4:
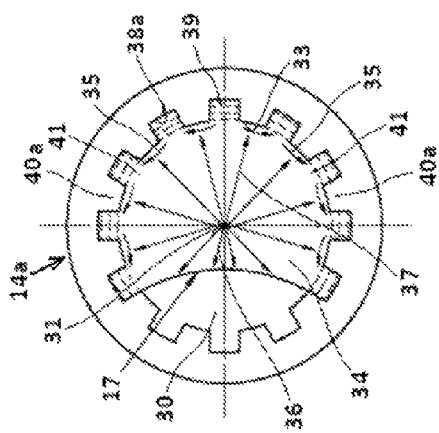
FIG. 4 is the same view as FIG. 3, but showing streamlines of the fluid flowing towards and over the bar barriers and the grooves between every two bar barriers after it has touched upon the upstream surface of the ball closure member.

FIG. 4 shows streamlines of the fluid with solid particles or liquid drops flowing towards circumferential surface 33 of bore of upstream seat ring 14a, over bar barriers 40 and across grooves 38a with the rectangular transverse cross-section around circumferential surface 33, and to opening 30 at last.

One branch of the fluid in the face of upstream opening 30 flows directly through it in unobstructed. The other branch facing upstream surface 34 of ball closure member 17 disperses radially according to the direction shown by flow arrows 31 having touched on upstream surface 34 of ball closure member 17, in which some fluid 37 impacts against circumferential surface 33, and the inner walls of rectangular cross-sectional grooves 38a distributed around circumferential surface 33 of bore 29 of upstream seat ring 14a, and the rest as shown by flow arrows 36 flows radially into opening 30 pressing against surface 34. The fluid flowed into grooves 38a previously will be stagnated in them as shown at 39 in FIG. 4b. Fluid 39 stagnated in grooves 38a can cushion the velocity of the subsequent fluid with the solid particles or liquid drops and decrease their kinetic energy impinging against the inner walls of grooves 38a, so the erosion of them gets mitigated. And then the decelerated fluid will spill out with the subsequent fluid flowing thereinto continuously, converges into two streams in the opposite directions as shown by flow arrows 35 flowing towards opening 30 around circumferential surface 33 and changes their flow directions uninterruptedly. During flowing to opening 30, streams 35 create a centrifugal force being proportional to the square of its velocity and pressing against surface 33. The solid particles or liquid drops carried in the fluid will be thrown onto circumferential surface 33 by the force and cause a severe tangential erosion of the circumferential surface of seat ring bores of a prior art valve. According to the present invention, the velocity of the fluid with the solid particles or liquid drops will be one after another decreased by a strong resistance from many bar barriers 40a around circumferential surface 33 while they are flowing over them.

A thick fluid layer 41 flowing slowly is formed around circumferential surface 33 while the decelerated fluid is flowing to opening 30 of the valve. Some of subsequent fluid 37, together with the solid particles or liquid drops, will be brought off by a fast flow fluid layer flowing on thick fluid layer 41 and into opening 30 along with it before entering into thick fluid layer 41. The rest will flow into thick fluid layer 41 passing through the fast flow fluid layer, and meet with much kinematic viscosity resistance of the fluid flowing slowly, so its velocity flowing towards circumferential surface 33 radially becomes slowed down and the erosion of surface 33 also mitigated to a certain extent.

In a word, the radial and tangential erosion of circumferential surface 33 and inner walls of grooves 38 will be minimized, and the valve lifetime is prolonged.

Figure 5:
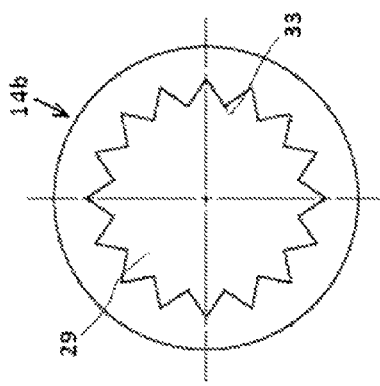
FIG. 5 is an elevation view of the seat ring in accordance with another embodiment of the present invention, showing many bar barriers with tooth-like transverse cross-section around the circumferential surface of its bore.

FIG. 5 is another embodiment of the present invention seat ring. Seat ring in FIG. 5 is similar to the one showing in FIG. 3, the only difference is that the rectangular cross-section of bar barriers 40 in FIG. 3 has been changed into tooth-like cross-section 40 in FIG. 5.

Figure 6:
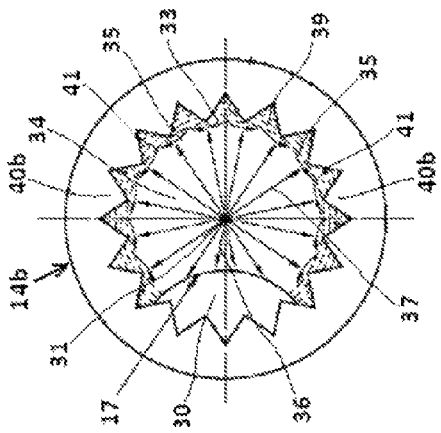
FIG. 6 is the same view as FIG. 5, but showing streamlines of the fluid flowing towards and over the bar barriers and the grooves between every two bar barriers after it has touched upon the upstream surface of the ball closure member.

FIG. 6 shows streamlines of the fluid flowing through upstream seat ring 14b in FIG. 5. Although the rectangular cross-section of bar barriers 40 in FIG. 4 has been changed into the tooth-like one 40, the effect resistant to erosion of the embodiment in FIG. 6 is the same as in FIG. 4. The like reference numerals in both figures represent like elements, therefore the working principle of bar barriers 40 with tooth-like cross-section in FIG. 6 is easy to understand in comparison with bar barriers 40 with rectangular cross-section in FIG. 4.

FIG. 7 consists of FIG. 7a and FIG. 7b, and shows fragmental cross-sectional views of a ball valve. Seat rings 14 with the bar barriers 40, such as the ones in FIG. 3 and FIG. 5 or analogous mechanisms 42 are mounted in valve 1. A radial end face of seat ring 14 engages with upstream surface 34 of ball closure member 17, and the other opposite radial end face 87 is abutted on shoulder 43 of recesses. The difference between FIG. 7a and FIG. 7b is that grooves 40 between two adjacent bar barriers or analogous mechanism 42 are radially concaved inward from circumferential surface of bore of upstream passageway 13 in FIG. 7a, while grooves 40 are radially projected outward from circumferential surface in FIG. 7b and the bar barriers or analogous mechanisms 42 between two adjacent grooves are exposed to upstream passageway 13 of valve 1. The diameter of valve seat ring bore 29 in FIG. 7a has the same size as port of upstream passageway 13, but bottom diameter 47a of grooves 40 in FIG. 7b has the same size as port of upstream passageway 13. Although there are two different designs in FIG. 7a and FIG. 7b, the function for decreasing the flow velocity and mitigating the erosion is exactly the same.

Figure 8:
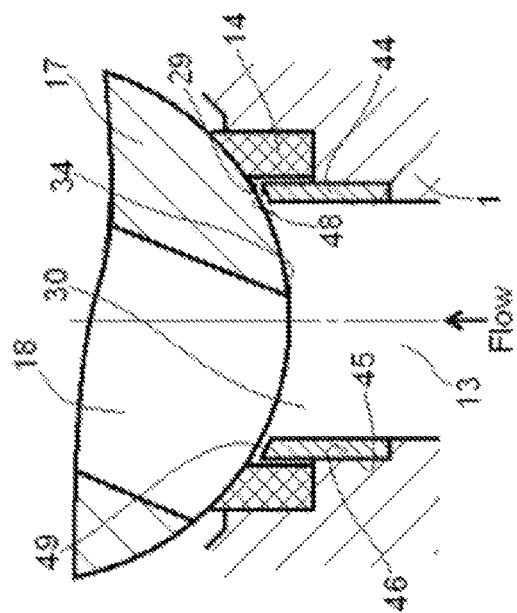
FIG. 8 is a fragmentary sectional view of a further embodiment of the present invention valve, showing a ball valve with an auxiliary seat ring made of a sleeve mounted in the pocket of valve upstream passageway together with an upstream seat ring.

FIG. 8 is a fragmentary sectional view of a further embodiment of the present invention valve, showing a ball valve with an auxiliary seat ring 44, therefore two seat rings, the upstream seat ring 14 and the auxiliary seat ring 44, are disposed in a stepped bore constituted by a big and a small bore surrounding upstream passageway 13 of valve housing 1. An upstream seat ring 14 is mounted in the big bore and an auxiliary seat ring 44 in the small bore. Upstream seat ring 14 and auxiliary seat ring 44 can be made of erosion-resistant material. Part of exterior surface 45 of auxiliary seat ring 44 at the end away from ball closure member 17 is inserted into and fixed in wall 46 of the small bore in upstream passageway 13, and the other end passes through bore 29 of upstream seat ring 14. Radial end face 48 of the other end of auxiliary seat ring 44 passing through bore 29 has the same geometry and curvature as upstream surface 34 of ball closure member 17, and they are spaced out by an equal clearance 49 for a free movement of ball closure member 17 relative to body housing 1 or engaged with upstream surface 34. And the width of clearance 49 should be as narrow as possible, so that the flow passing through clearance 49 radially will meet with much resistance, its velocity flowing to the circumferential surface of bore 29 of upstream seat ring 14 becomes very slow and erosion of it gets alleviated during opening and closing movement of the valve. For the same reason, a gap between the interior circumferential surface of upstream seat ring bore 29 and exterior circumferential surface 45 of auxiliary seat ring 44 is also quite small, the longitudinal flow of the fluid in the gap is much difficult and will meet with a strong resistance, therefore both the circumferential surfaces would not be eroded tangentially.

Auxiliary seat ring 44 separated the fluid flowing in upstream passageway 13 from upstream seat ring 14 cannot cause the fluid flowing to upstream opening 30 to erode the sealing surface of seat ring 14, as a result, the circumferential surface of bore of the auxiliary seat ring replaces upstream seat ring 14 to contact directly with the fluid, makes the fluid flowing into upstream opening 30 not erode the sealing surface of seat ring 14 while flowing to downstream of the valve and protects it from damage, so the valve becomes much resistant to erosion even if the upstream seat ring is made of polymer.

Furthermore, the radial end face 48 of the auxiliary seat ring 44 can also be engaged with the upstream surface 34 of the ball closure member 17, and in this way the radial end face 16 is granted a scraping function which can scrape off substance adhered on the upstream surface 34 of the ball closure member 17 during the ball moving.

FIG. 9a and FIG. 9b are other embodiments in accordance with the present invention used in the auxiliary seat ring 44 in FIG. 8. For both auxiliary seat rings as shown in FIG. 9, one end of them passes through bore 29 of upstream seat ring 14, and the other end is fixed in a small bore formed by a shoulder and an interior circumferential surface 46 surrounding upstream passageway 13 of valve 1. The radial end face 48 passing through bore 29 of upstream seat ring 14 is very close to upstream surface 34 of ball closure member 17, has the same geometric shape and curvature as it and separated by an equal clearance 49 for free movement of the closure member. The opposite radial end face is abutted against shoulder of the small bore.

The different point between FIG. 9a and FIG. 9b is that auxiliary seat ring 44 in FIG. 9a has an equal diameter inner hole being the same size as upstream passageway 13 of valve 1, whereas auxiliary seat ring 44 in FIG. 9b has a stepped hole, in which the diameter of smaller hole 47c is less than the one of upstream passageways 13 and its circumferential surface is projected into upstream passageway 13 of valve 1 towards its axis, the inside diameter of bigger hole 47b is equal to the one of upstream passageways 13. Many bar barriers or analogous mechanisms 42 disclosed in FIG. 3 or FIG. 5 are distributed around the circumferential surface of equal diameter inner hole (FIG. 9a) or smaller hole 47c (FIG. 9b) respectively, which extended a distance (as shown in FIG. 9) or an overall distance (not shown) longitudinally from the radial end face 48 close to upstream surface 34 of ball closure member 17 towards the opposite radial end face upstream. Radial end face 48 of auxiliary seat rings 44 has the same geometry and curvature as upstream surface 34 of ball closure member 17, and keeps an equal clearance 49 or engages with it. The flow resistance for bar barriers or analogous mechanisms 40 in FIG. 9a is a little bigger than the one in FIG. 9b after the valve is fully opened.

The auxiliary seat rings 44 in FIG. 9 are composed of a secondary bushing 441 and a primary bushing 442 with the bar barriers or analogous mechanisms 42. Primary bushing 442 is attached to secondary bushing 441 by way of inserting after the bar barriers or analogous mechanisms 42 around the interior circumferential surface of primary bushing 442 have been machined. There are other methods to fix secondary bushing 441 to primary bushing 442, such as welding, gluing and screwing.

The auxiliary seat ring combined by two separated annular bushings as shown in FIG. 9a is better than the entire bushing, owing to its easy of machining, if the bar barriers or analogous mechanisms 42 are concaved inward from circumferential surface of upstream passageway 13 radially and extended only a distance longitudinally from the radial end face close to the upstream surface of the valve closure member towards the opposite radial end face as shown in FIG. 9a. The auxiliary seat ring of the present invention has the same effect on reducing velocity of the fluid flow whether it is the entire bushing or composed of two annular bushings. The entire bushing or the primary bushing can be made of materials resistant to erosion by the solid particles or liquid drops carried in the fluid, such as stainless steels, ceramics or hard alloys.

The upstream seat ring and the auxiliary seat ring provided with the bar barriers or analogous mechanisms 42 with toothlike transverse cross-section as shown in FIG. 5, are endowed with a function scraping off the substance adhered to the upstream surface of ball closure member since tines at the top of the teeth near their radial end faces have much stronger stress concentration than the circular edge of bore close to their radial end faces in prior art valve.

Whether it is an entire bushing or two separated annular bushings, the working principle of auxiliary seat ring with bar barriers or analogous mechanisms are the same as the ones in FIG. 3 and FIG. 5.

For quarter turn valves (including ball valve, semi-sphere ball valve, V-port ball valve and plug valve) as shown in FIG. 7a and FIG. 7b, the vertical distance from radial end surface 87 of upstream seat ring 14 abutted on shoulder 43 to the center of closure member 17 (not shown) should be larger than radius of closure member 17, so that the highest one in the flow layer flowing radially towards the circumferential surface of bore 29 of seat ring 14 and then around it tangentially after the fluid has touched the upstream surface of closure member 17 and dispersed radially, would be not higher than radial end surface 87, so that the clearance between radial end surface 87 and shoulder 43 would not be eroded, the flow velocity of the fluid and the particles or liquid drops carried in it will be sufficiently cushioned by the fluid stagnated in the grooves previously and the flow meets with a resistance from the bar barriers or analogous mechanisms as much as possible while crossing them. So then the velocity of the fluid flow gets reduced dramatically, and radial and tangential erosion losses of the circumferential surface of the seat ring is diminished or even eliminated.

For multi-turn valves such as gate valve, a distance from the upstream surface of the closure member to the radial end surface of the upstream seat ring away from it, and from the upstream surface of the closure member to the radial end face of the bar barriers or analogous mechanisms of the auxiliary seat ring away from it longitudinally should have a suitable height, so that the highest one in the flow layer flowing radially towards the circumferential surface of bore of the upstream seat ring and then around it tangentially after the fluid has touched the upstream surface of the closure member and dispersed radially, clearance between the radial end surface and the shoulder would not be eroded, the flow velocity of the fluid and the particles or liquid drops carried in it will be sufficiently cushioned by the fluid stagnated in the grooves previously when they are flowing into them, and their flow will meet with a resistance as much as possible from the bar barriers or analogous mechanisms during across them.

Many bar barriers or analogous mechanisms concaved inward or projected outward from the circumferential surface of the bore radially, and spaced each other radially distributed around the circumferential surface of bore of the upstream seat ring or inner hole of the auxiliary seat ring, not only decrease the flow velocity of the fluid and the particles or liquid drops carried in it flowing radially towards and tangentially around the circumferential surface, but also change the flow field passing through the upstream opening. The changed flow field can alleviate the erosion of upstream seat ring and/or body housing of the valves.

Although the present invention was described in terms of specific embodiments, it is obvious to a person skilled in the art that various alterations and additions are possible without departing from the spirit of the invention which is set out in the appended claims, therefore the extent disclosed in the embodiments above is only for purpose of illustration and not intended to be limited by this description.

What is claimed is:

1. A valve having an auxiliary seat ring with improved resistant capability to erosion caused by fluid carried solid particles or liquid drops, said valve comprising:
   a. A body housing, said body housing has an upstream passageway and a downstream passageway and an inner chamber located therebetween for disposing a valve closure member, has an opening passing through said body housing being normal to axis of said passageways used for receiving a valve stem, has a shoulder hole composed of a big hole for disposing an upstream seat ring and a small hole for receiving the auxiliary seat ring to close the inner chamber, which are both surrounding said upstream passageway, and has an annular container composed of a radial shoulder and an interior circumferential surface surrounding said downstream passageway for accommodating a downstream seat ring;
   b. A movable closure member, said closure member has a planar or regular curvature exterior surface, being disposed in said inner chamber, and a top portion of the closure member is connected with a lower end of said stem, said closure member is actuated by said stem to rotate about or reciprocate along its axis relative to said body housing for shutting off or throttling the said fluid;
   c. A stem, a lower end of said stem inserts into said body housing through the opening of said body housing, said lower end is connected with the top portion of said closure member, and an upper end of the stem is exposed outside said body housing being connected with a device for moving said closure member between a fully closed position where an upstream exterior surface of said closure member blocks the upstream passageway and a fully open position where said passageway is opened completely;
   d. A pair of seat rings, one of said seat rings called upstream seat ring is positioned within the big hole of said shoulder hole in the upstream passageway of said body housing, other one is positioned within the annular container in the downstream passageway, and both seat rings are clamped by said body housing and said closure member respectively, each of said seat rings having an end face engaged with the exterior surface of said closure member, and an opposite end face is abutted on the shoulder in said big hole or container;
   e. the auxiliary seat ring, said auxiliary seat ring is disposed in the small hole of the shoulder hole in the upstream passageway of said valve, said auxiliary seat ring is an annular sleeve inserted into and secured within the small hole, one of end faces of said auxiliary seat ring is abutted on the shoulder in said small hole, and other opposite radial end face passes through said upstream seat ring to keep a equal clearance with the upstream surface of said closure member, said auxiliary seat ring separating said upstream seat ring from said fluid flowing in said upstream passageway; wherein many bar barriers are distributed around a circumferential surface of a hole of said auxiliary seat ring, are radially concaved inward or projected outward from the circumferential surface of the hole, are extended a distance from the end face close to the upstream surface of said closure member towards the opposite end face along axis of the hole, and are spaced each other.

2. The valve recited in claim 1, wherein said bar barriers distributed on the circumferential surface of the hole of said auxiliary seat ring possess a rectangular transverse cross-section, or a tooth-like transverse cross-section, or any other geometrical shapes.

3. The valve recited in claim 1, wherein the end face of said auxiliary seat ring including said bar barriers close to the upstream surface of said closure member keeps engaging with the upstream surface of said closure member.

4. The valve recited in claim 1, wherein said auxiliary seat ring consists of a secondary bushing and a primary bushing with said bar barriers and said primary bushing is secured to said secondary bushing by way of inserting, welding or screwing.

* * * * *